United States Patent Office 2,930,779
Patented Mar. 29, 1960

2,930,779

REACTION PRODUCTS OF A POLYMER OF A VINYLENE ESTER AND A NITROGENOUS COMPOUND

Erhart K. Drechsel, Springdale, Conn., assignor to American Cyanamid Company, New York, N.Y., a corporation of Maine No Drawing. Application May 13, 1954
Serial No. 429,689

18 Claims. (Cl. 260—72)

This invention relates to the production of new synthetic materials and, more particularly, new resinous (or potentially resinous) compositions which are especially suitable for use in the plastics and coating arts. My new compositions are obtained by reaction between ingredients comprising (1) a polymer (including both homopolymers and copolymers or interpolymers) of an unsaturated ester, more particularly an unsaturated carbonate, and specifically vinylene carbonate containing at least 10 mole percent of combined vinylene carbonate) and (2) at least one nitrogenous compound selected from the class consisting of ammonia, primary amines (including both the primary monoamines and polyamines) and the secondary amines (including both the secondary monoamines and polyamines). The scope of the invention also includes aldehyde-reaction products, specifically formaldehyde-reaction products, of the aforementioned reaction products of a polymer of vinylene carbonate and the aforesaid nitrogenous compound, as well as method features. Instead of an aldehyde as a reactant, other active carbonyl-containing compounds can be used, e.g., a ketone.

Illustrative examples of amines that can be used as a reactant with the aforementioned polymer of vinylene carbonate are the alkanol monoamines, e.g., the ethanol monoamines, propanol monoamines, etc., containing at least one hydrogen atom attached to the amino nitrogen atom; the hydrocarbon-substituted monoamines containing at least one hydrogen atom attached to the amino nitrogen atom, e.g., the primary and secondary, saturated and unsaturated aliphatic (including cycloaliphatic) hydrocarbon monoamines, the primary and secondary aromatic hydrocarbon monoamines, the primary and secondary, aromatic-substituted aliphatic hydrocarbon monoamines, and the aliphatic-substituted aromatic hydrocarbon monoamines; the polyalkylene polyamines containing at least one amine grouping having at least one hydrogen atom attached to the amino nitrogen atom; and others that will be apparent to those skilled in the art from the foregoing general examples and from the more specific examples given hereinafter. Thus, it will be apparent that there also can be used amines containing one or more (e.g., two, three, four, five or higher number) primary amino groups together with one or more (e.g., two, three, four, five or higher number) secondary amino groups, with or without hydroxyl or other active or inactive groups (e.g., tertiary amino groups) attached to the chain. Hydrazine and substituted hydrazines containing at least one hydrogen atom attached to an amino nitrogen atom also can be employed as the amine reactant with the polymer of vinylene carbonate.

In my copending application Serial No. 400,107, filed December 23, 1953, now Patent No. 2,794,013, dated May 28, 1957, I have disclosed compositions comprising a reaction product of ingredients comprising vinylene carbonate (monomeric vinylene carbonate) and ammonia, or a primary or secondary amine, or a mixture of such nitrogenous compounds. The claims of the aforesaid patent specify that the reactant with the vinylene carbonate is at least one nitrogenous compound selected from the class consisting of ammonia and primary amines, the latter having only single bonds between any adjacent carbon atoms of any straight-chain radical which is a component thereof. The present invention is separate and distinct from the invention disclosed and claimed in the aforementioned patent, as it involves the use of a polymer of vinylene carbonate in preparing a different kind of synthetic material.

It is a primary object of the present invention to prepare a new class of synthetic materials, more particularly resinous compositions, which have particular utility in the plastics and coating arts, e.g., as coating, laminating, adhesive, impregnating, casting and molding compositions as well as in other applications, for instance, in the treatment of textiles, paper, etc. They also may be used as components of plastics and coatings compositions. Other objects of the invention will be apparent to those skilled in the art as the description of the invention proceeds.

The present invention is based on my discovery that new and valuable materials for use in coating, molding and other applications can be prepared by effecting reaction between ingredients comprising (1) a polymer of vinylene carbonate containing at least 10 mole percent of combined vinylene carbonate and up to 90 mole percent of a different compound which is copolymerizable with vinylene carbonate and which contains a $CH_2=C<$ grouping, and (2) at least one nitrogenous compound selected from the class consisting of (a) ammonia, (b) primary amines and (c) secondary amines. Mixtures of any two or all three of the nitrogenous compounds of (a), (b) and (c) in any proportions can be used, if desired. The polymer of vinylene carbonate may be homopolymeric vinylene carbonate or it may be a copolymer containing at least 10 mole percent of combined vinylene carbonate, e.g., one containing from 10 or 15 to 90 or 95 or even as high as 99.9 mole percent of combined vinylene carbonate. Advantageously, if a copolymer be employed, it is one which is a product of polymerization of a mixture of copolymerizable ingredients including (a) vinylene carbonate and (b) a different compound containing a $CH_2=C<$ grouping, more particularly a single $CH_2=C<$ grouping (e.g., vinyl chloride, vinylidene chloride, styrene, the various methyl-, ethyl- and other lower alkyl-styrenes, the various chlorostyrenes, acrylonitrile, methacrylonitrile, acrylamide, methocrylamide, etc.), the vinylene carbonate of (a) constituting at least 50 mole percent, more particularly from 60 to 95 mole percent, of the said mixture of copolymerizable ingredients.

Vinylene carbonate has the formula

I 

When ammonia or a primary saturated aliphatic monoamine is employed as a reactant with a polymer of vinylene carbonate the initial reaction which takes place may be illustrated by the following equation, and for purpose of specific illustration ammonia is shown as the nitrogenous compound employed:

II 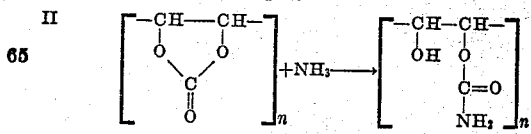

The reaction product of Equation II is capable of undergoing inter-reaction between molecules thereof to form higher-molecular-weight polymers. Or, the reaction product of Equation II can be reacted with an active carbonyl-containing compound or compounds, for instance an aldehyde, a ketone, a mixture of an aldehyde and a ketone in any proportions, etc., to form a new class of condensation products, more particularly resinous or potentially resinous condensation products. When the active carbonyl-containing compound is an aldehyde, specifically formaldehyde, the initial reaction between the aldehyde and the reaction product of Equation II can be illustrated by the following equation:

III 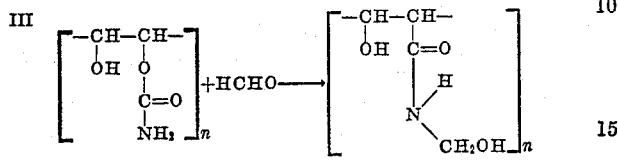

The N-carbinol, specifically N-methylol, derivative obtained by the above reaction is capable of further reaction to form the corresponding N-methylene derivatives and cross-linked resinous polymers, that is, polymers in a cured or substantially insoluble, substantially infusible state.

The choice of the active carbonyl-containing compound, which is used as a reactant with the reaction product of the polymer of vinylene carbonate and the aforesaid nitrogenous compound, is dependent largely upon economic considerations and the particular properties desired in the finished product. I prefer to use as the active carbonyl-containing compound an aldehyde, and more particularly formaldehyde or compound engendering formaldehyde, e.g., paraformaldehyde, hexamethylenetetramine, trioxane, etc. Illustrative examples of other aldehydes that may be employed are acetaldehyde, propionaldehyde, butyraldehyde, heptaldehyde, octaldehyde, acrolein, methacrolein, crotonaldehyde, benzaldehyde, furfural, hydroxyaldehydes (e.g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and polymethylol derivatives, of urea, thiourea, iminourea, and of substituted ureas, thioureas and iminoureas, mono- and poly-(N-carbinol) derivatives of amides of polycarboxylic acids, e.g., maleic, itaconic, fumaric, malonic, succinic, citric, phthalic, etc., mono- and poly-(N-carbinol) derivatives of the aminotriazines, of the aminotriazoles, of the aminodiazines, etc. Good results are obtained with aldehyde-addition products such as methylol urea and thiourea, especially mono- and dimethylol ureas and thioureas, and a methylol melamine, e.g., monomethylol melamine and polymethylol melamines (di-, tri-, tetra-, penta- and hexamethylol melamines). Mixtures of aldehydes and aldehyde-addition products may be employed, e.g., mixtures of formaldehyde and methylol compounds such, for instance, as dimethylol urea, trimethylol melamine, hexamethylol melamine, etc.

Illustrative examples of ketones that may constitute the active carbonyl-containing compound are acetone, methyl ethyl ketone, methyl propyl ketone, cyclobutyl ketone, benzophenone, 2-propanone, 2,4-pentanedione, 2-pentanone, 3-pentanone, 4-heptanone, acetophenone, propiolphenone, etc.

Instead of using a single aldehyde or a single ketone as the active carbonyl-containing compound, I may use a plurality of different aldehydes, or a plurality of different ketones, or a mixture of an aldehyde and a ketone in any proportions.

In addition to ammonia and the monoamines, a polymer of vinylene carbonate containing at least 10 mole percent of combined vinylene carbonate also is reactable with polyamines containing at least one hydrogen atom attached to an amino nitrogen atom. The reaction of the aforementioned vinylene carbonate polymers with such polyamines may be illustrated by the following equation where a polyamine represented by the formula $H_2N-R-NH_2$, where R represents an alkylene radical, is taken as illustrative of the amine reactant:

IV 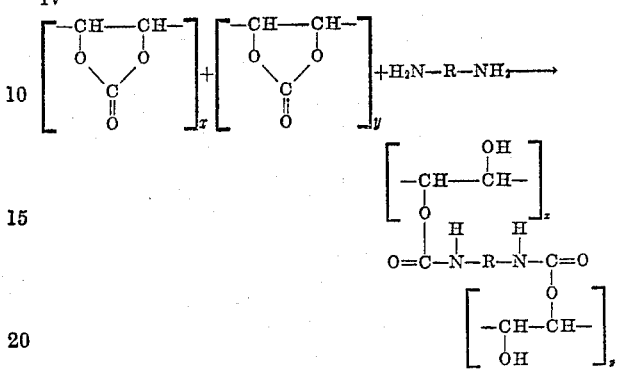

In preparing the reaction product ("vinylene carbamate" polymer) of the vinylene carbonate polymer with the aforementioned nitrogenous compound (that is, ammonia or a primary or secondary amine) the proportions of the reactants can be widely varied depending, for example, upon the particular starting reactants employed and the particular conditions of reaction. The amount of the nitrogenous compound should be sufficient to react with at least one of the vinylene carbonate units in the polymer molecule, more particularly from one to all of the aforesaid vinylene carbonate units. Ordinarily the nitrogenous compound is employed in an amount such that at least 1%, preferably at least 5% e.g., from 10 or 15% up to 100%, of the vinylene carbonate units are converted into the corresponding carbamate units.

The temperature of the reaction also can be varied considerably depending, for instance, upon the particular reactants employed, the rapidity of the reaction wanted, the particular properties desired in the reaction product, and other influencing factors. For example, the reaction temperature can be varied from room temperature (20°–30° C.) up to about 100° C., preferably not higher than about 60° or 65° C. if the reaction can be caused to proceed at the lower temperatures. The reaction mass is cooled, if necessary, in order to keep the temperature thereof to the optimum temperature of reaction.

The reaction can be effected in the absence of a solvent or other additive, or in the presence of (i.e., intimately associated with) a relatively inert solvent (e.g., water, benzene, toluene, xylene, dioxane, acetone, ethyl methyl ketone, methyl isobutyl ketone, chlorobenzene, chloroform, ethylene dichloride, methanol, ethanol, propanol, butanol, pentanol, hexanol, allyl alcohol, methallyl alcohol, benzyl alcohol and other monohydric alcohols, including those belonging to the saturated and unsaturated aliphatic and aromatic-substituted aliphatic series; the various liquid alcohol-ethers, for example, ethylene glycol monomethyl ether, ethylene glycol monoethyl ether, diethylene glycol monomethyl ether, diethylene glycol monoethyl ether, etc.; as well as numerous others that will be apparent to those skilled in the art. An excess of the amine reactant over stoichiometrical proportions may constitute the medium in which the reaction is effected. The inert or active liquid medium or additive, if employed, can be used in any suitable amount ranging, for instance, from 0.1 to 40 or 50 times that of the weight of the primary reactants (polymer of vinylene carbonate and ammonia or a primary or secondary amine in reactive proportions). Good results are obtained when the liquid reaction medium is employed in an amount such that the primary reactants constitute from about 20% to about 30 or 35% by weight of the reaction mass. At the end of the reaction period, the inert or unreacted liquid medium is then removed from the reaction mass by any suitable means, for example by distillation, decantation, etc., or the solid reaction product can be separated from the liquid component of the reaction mass by filtration, centrifuging, etc.

For certain applications it may be desirable to modify the properties of the carbamate polymers of this invention. One method of effecting this result is to react this polymer with an active carbonyl-containing compound, especially an aldehyde, e.g., formaldehyde. For this purpose the ratio of the aldehydic reactant to the carbamate polymer may be varied as desired or as conditions may require, the proportions depending upon such influencing factors as, for instance, the particular carbamate polymer and aldehydic reactant employed and the particular properties desired in the finished product. If the aldehydic reactant is an aldehyde, e.g., formaldehyde, it is used in an amount sufficient to react with at least one of the reactive amino groups in the polymer, more particularly from one to all of the aforesaid reactive amino groups. Ordinarily the aldehydic reactant is employed in an amount such that at least 1% of the hydrogen atoms attached to the amino nitrogen atom of the carbamate polymer are replaced either by alkylol (specifically methylol) groups or by dehydration products thereof. Thus I may use, for example, from 0.5 to 2 moles of the aldehyde for each aldehyde-reactable recurring vinylene carbamate unit in the polymer.

When the aldehyde is available for reaction in the form of an alkylol derivative, more particularly a methylol derivative, e.g., dimethylol urea, trimethylol melamine, etc., amounts of such alkylol derivatives corresponding to or higher (e.g., from a few percent more to 15 or 20 times as much) than the relative amounts mentioned above with reference to the aldehyde may be used. When the aldehydic reactant is a reactive product of reaction of ingredients comprising an aldehyde and, for example, an amidogen compound that has been reacted beyond the alkylol stage, but is still capable of co-reacting with the carbamate polymer, then the proportions thereof with respect to the said polymer may be either more or less than those proportions just mentioned with respect to the use of an aldehyde or an alkylol derivative as the aldehydic reactant. Depending upon the particular starting reactants employed and the particular properties desired in the finished product, the weight proportions of reactants (i.e., aldehydic reactant and carbamate polymer) can range, as desired or as conditions may require, from 1:99 to 99:1, more particularly from 10:90 to 90:10, bearing in mind that when the aldehydic reactant is an ordinary aldehyde the proportions are usually of the order of those given in the preceding paragraph.

The reaction between the aldehydic reactant and the polymer of the vinylene carbamate can be effected under a wide range of pH conditions (i.e., acid, alkaline or neutral conditions, for example a pH of from about 1 or 2 to about 11, and more specifically a pH of from about 6 to about 9).

Any suitable temperature can be employed for effecting reaction between the carbamate polymer and the aldehydic reactant. In some cases the reaction can be initiated at room temperature (20°–30° C.). Ordinarily, the temperature of the reaction varies between about 60° C. and the reflux temperature of the reaction mass when the reaction is carried out at atmospheric pressure in the presence of a solvent or diluent. If the reaction be carried out at pressures above atmospheric, temperatures as high as, for example, 200°–225° C. or even higher may be employed.

The reaction between the aldehydic reactant, e.g., formaldehyde, a butylated melamine-formaldehyde partial reaction product, a methylol (e.g., monomethylol or dimethylol) methacryloguanamine, dimethylol urea, trimethylol melamine, etc., and the carbamate polymer can be carried out in the presence of solvents or diluents, other natural or synthetic bodies (numerous examples of which hereafter are given), or while admixed with other materials which are reactable or non-reactable with the aldehydic reactant or with the aforementioned polymer, e.g., urea, thiourea, cyanamide, dicyandiamide, phthalic diamide, acetamide, chlorinated acetamides, methyl ethyl ketone, etc.; aldehyde-reactable triazines, e.g., melamine, ammeline, ammelide, etc.; phenol and substituted phenols, e.g., the cresols, the xylenols, the tertiary-alkyl phenols, etc.; monohydric and polyhydric alcohols, e.g., butyl alcohol, amyl alcohol, heptyl alcohol, n-octyl alcohol, 2-ethylhexyl alcohol, ethylene glycol, propylene glycol, glycerine, polyvinyl alcohol, etc.; amines, including aromatic and aliphatic amines, e.g., aniline, tributylamine, diamylamine, etc.; and the like.

If the reaction between the carbamate polymer and the aldehydic reactant is carried out in the presence of ammonia or a primary or secondary amine, then one can effect simultaneous reaction between the aldehyde and the amino groups of the carbamate units of the polymer on the one hand, and between the ammonia (or primary or secondary amine, if used) and any vinylene carbonate units in the polymer that were not previously converted into carbamate units on the other hand. Such newly created carbamate units of the polymer then can react with aldehydic reactant as hereinbefore described.

The modifying reactants may be incorporated with the carbamate polymer and the aldehydic reactant to form an inter-reaction product by mixing all the reactants and effecting reaction therebetween under acid, alkaline or neutral conditions or by various permutations of reactants. For example, I may effect partial reaction or, more particularly, condensation between the chosen aldehydic reactant and the polymer, then add the modifying reactant, e.g., urea, melamine, etc., and effect further reaction. Or, I may first partially react urea, melamine or other aldehyde-reactable modfying reactant with a molecular excess of an aldehyde under acid, alkaline or neutral conditions, then add the carbamate polymer and effect further reaction. Or, I may separately partially react (1) urea, melamine or other aldehyde-reactable modifying reactant and an aldehyde and (2) a carbamate polymer of the kind used in practicing one embodiment of the present invention and an aldehyde, thereafter mixing the two products of partial reaction and effecting further reaction therebetween. The reactants of (1) and (2) initially may be partially reacted under acid, alkaline or neutral conditions.

It will be understood, of course, by those skilled in the art that reference hereinbefore and later herein to "aldehyde" or "aldehydic reactant" in describing the process, reaction conditions, etc., has been for ease of description, that it is not intended to be limiting in nature, and that, instead of an aldehyde, an equivalent amount of a ketone or other active carbonyl-containing compound can be used. As mentioned hereinbefore the polymer of the vinylene carbonate which is used as a starting reactant can be homopolymeric vinylene carbonate or it can be a copolymer of vinylene carbonate with any other unsaturated material that is copolymerizable therewith. From a practical standpoint, and to obtain the full advantages of the invention, it is desirable that the copolymer, if used, be one which contains at least 10 mole percent of combined vinylene carbonate. From a cost and efficiency standpoint it is also desirable that the monomer which is copolymerized with the vinylene carbonate be one which is free from groups that, during reaction between the copolymer and the ammonia, or primary or secondary amine, might be reactive with the latter or might hydrolyze under the reaction conditions.

The polymer (homopolymer or copolymer) of vinylene carbonate employed can be of any desired molecular weight, for example an average molecular weight ranging between about 500 and about 5,000,000 or more as determined by viscosity measurements using the Staudinger equation.

The substance which is copolymerized with the vinylene carbonate to form the copolymer can be a compound which is different therefrom, which is copolymerizable therewith and which contains a polymerizable ethylenic linkage, more particularly a $CH_2=C<$ grouping.

Examples of such substances that can be copolymerized with vinylene carbonate in the proportions hereinbefore mentioned, singly or a plurality (two, three, four or any desired number) thereof, the latter often being desirable in order to improve the compatibility and copolymerization characteristics of the mixture of monomers and to obtain a copolymer intermediate having the particular properties desired for a particular use thereof are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e.g., methacrylic, ethacrylic, propacrylic, etc., and aryacrylic, e.g., phenylacrylic, etc.), crotonic, oxalic, malonic, succinic, glutaric, adipic, pimelic, suberic, azelaic, sebacic, fumaric, citraconic, mesaconic, itaonic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e.g., styrene, o-, m- and p-chlorostyrenes, -bromostyrenes, -fluorostyrenes, -methylstyrenes, -ethylstyrenes, -cyanostyrenes, the various polysubstituted styrenes such, for example, as the various di-, tri- and tetrachlorostyrenes, -bromostyrenes, -fluorostyrenes, -methylstyrenes, -ethylstyrenes, -cyanostyrenes, etc., vinylnaphthalenes, vinylcyclohexanes, vinylfuranes, vinylpyridines, divinylbenzenes, trivinylbenzenes, allylbenzenes, diallylbenzenes, N-vinylcarbazole, the various allyl cyanostyrenes, etc.; the various alpha-substituted styrenes and alpha-substituted ring-substituted styrenes, e.g., alpha-methylstyrene, alpha-methyl-para-methyl styrene, etc.; unsaturated ethers, e.g., ethyl vinyl ether, diallyl ether, ethyl methallyl ether, etc.; unsaturated amides, for instance N-allylcaprolactam, acrylamide and N-substituted acrylamides, etc.; unsaturated ketones, e.g., methyl vinyl ketone, methyl allyl ketone, etc.; methylene malonic esters, e.g., methylene methyl malonate, etc.; unsaturated aliphatic hydrocarbons, e.g., ethylene, propylene, butadienes, e.g., 1,3-butadiene, 2-chlorobutadiene, etc.; unsaturated polyhydric alcohol (e.g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with vinylene carbonate, and which constitute a preferred class in making vinylene carbonate copolymers for use in practicing the present invention, are the vinyl halides, more particularly vinyl fluoride, vinyl chloride, vinyl bromide and vinyl iodide, and the various vinylidene compounds, including the vinylidene iodide, e.g., vinylidene chloride, vinylidene fluoride and vinylidene iodide, other comonomers being added if needed in order to improve the compatability and copolymerization characteristics of the mixed monomers.

Other and more specific examples of monomeric materials which can be mixed or blended with vinylene carbonate in the aforementioned proportions, and the resulting homogeneous or substantially homogeneous, polymerizable composition then polymerized to yield copolymer intermediates for use in practicing the present invention are the allyl compounds and especially those which have a boiling point of at least about 60° C. Of the monomeric materials which can be used the allyl esters form a large class. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

Additional examples of allyl compounds, and of other compounds containing one or more $CH_2=C<$ groupings that can be used in producing the copolymer intermediates employed in carrying one embodiment of my invention into effect are given in, for example, Drechsel and Padbury Patent No. 2,550,652, dated April 24, 1951, and especially in that portion thereof with particular reference to monomers used in forming coopolymers with diallyl cyanamide alone or with other comonomers. Still other examples of comonomers that can be polymerized with vinylene carbonate, individually or a plurality thereof, are given in the copending application of John A. Price and John J. Padbury, Serial No. 353,666, filed May 7, 1953, now Patent No. 2,722,525, dated November 1, 1955.

Other examples of copolymerizable substances that can be copolymerized with vinylene carbonate to form the copolymer intermediate include the polymerizable unsaturated alkyd resins (modified or unmodified), e.g., ethylene glycol maleate, diethylene glycol maleate phthalate, ethylene glycol maleate succinate and diethylene glycol maleate linoleate. As will be understood by those skilled in the art, the unsaturated alkyd resin and vinylene ester are chosen from those which are compatible and copolymerizable with each other. Other and more specific examples of unsaturated alkyd resins that can be used are given, for example, in Nyquist and Kropa Patent No. 2,503,209, dated April 4, 1950, and patents referred to therein (see, for instance, column 8, lines 1–64). The unsaturated alkyd resins contain a plurality of polymerizably reactive alpha, beta-enal groups,

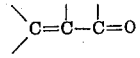

and are prepared in accordance with technique well known to those skilled in the resin art.

Other examples of compounds that can be copolymerized with vinylene carbonate to form the copolymer intermediate are given in Kropa Patent No. 2,510,503 (e.g., column 2, line 46, to the end of the sentence in line 16, column 3; column 5, line 54, through line 46, column 7; and column 13, line 42, through line 30, column 16; and in the aforesaid Nyquist et al. Patent No. 2,503,209 (see, for instance column 5, line 67, through line 75, column 7; and column 9, line 74, through line 12, column 11).

Mixtures of different compounds containing a $CH_2=C<$ grouping, or mixtures of different unsaturated alkyd resins, or mixtures of a compound containing a $CH_2=C<$ grouping and an unsaturated alkyd resin can be used as the unsaturated material in forming the copolymer intermediate.

The vinylene carbonate homopolymers and copolymers used in practicing the present invention can be produced by any suitable means, for instance as described in the aforementioned Price and Padbury copending application Serial No. 353,666 with particular reference to the production of vinylene carbonate copolymers; also, as described in the aforementioned patents with reference to the preparation of other copolymers. In other words, the vinylene carbonate homopolymers and copolymers are prepared by conventional methods used in producing other homopolymers and copolymers.

In order that those skilled in the art may better understand how the present invention can be carried into effect, the following examples are given by way of illustration and not by way of limitation. All parts and percentages are by weight.

Example 1

|                        | Parts | Approx. Molar Ratio |
|------------------------|-------|---------------------|
| Vinylene carbonate     | 86.0  | 1.0                 |
| Cumene                 | 240.0 | 2.0                 |
| Dodecyl mercaptan      | 40.0  | 0.2                 |
| Di-tert.-butyl peroxide| 2.5   | 0.02                |

The above ingredients are mixed together in a suitable reaction vessel provided with a reflux condenser and heated therein to reflux, and then maintained at the reflux temperature of the mass (about 142° C.) for 3 hours. The reaction mass containing homopolymeric vinylene carbonate in solution is permitted to cool. After filtering off a trace of solid particles that are present, the amber-colored polymer solution is used in a series of additional reactions hereinafter described.

To 350 parts of the aforementioned cumene solution containing one equivalent of homopolymeric vinylene carbonate is added 58 parts of approximately 29% aqueous ammonia (17 parts $NH_3$ or 1 mole) and 200 parts of water. This is vigorously stirred for 2 hours at room temperature (20°–30° C.). A mild exothermic reaction takes place. The aqueous layer containing the ammonia reaction product (vinylene carbamate polymer) settles readily without emulsion formation and is readily separated from the organic phase. The cumene phase can be washed, if desired, with additional water to recover any vinylene carbamate polymer retained therein, and the washings then combined with the main aqueous portion.

Evaporation of a portion of the aqueous vinylene carbamate polymer solution cast on glass, in a 105° C. oven, yields a hard film. When another portion is applied to cotton fabric, followed by drying in an oven at 105°–110° C. for about 16 hours, reaction with the cellulose apparently takes place as evidenced by the fact that about 20% of the vinylene carbamate polymer is retained after continuous aqueous extraction of the treated cloth to a constant weight.

Example 2

This example illustrates the preparation of an aldehyde-reaction product, specifically a formaldehyde-reaction product, of the vinylene carbamate polymer of Example 1.

Example 1 is repeated. After separation of the aqueous phase the remaining cumene solution is washed first with 81 parts of an aqueous solution of formaldehyde containing approximately 37% HCHO and 150 parts of water. The resulting aqueous phase is then combined with the previously separated aqueous solution containing most of the vinylene carbamate polymer. The cumene solution is given a second wash with 90 parts of water, and this washing also is added to the aforementioned aqueous solution of vinylene carbamate polymer. The aqueous solution is heated at 70° C. for about 30 minutes at a pH of about 7–8 to form the N-methylol derivative of homopolymeric vinylene carbamate.

A hard film is obtained when a portion of the aforementioned solution of the N-methylol derivative is cast on a plate of glass and then heated in a 105° C. oven for 1 hour. Treatment of cotton fabric with the solution, as described in the preceding example, results in a somewhat higher retention of impregnant than that obtained with the vinylene carbamate polymer of Example 1.

Example 3

One hundred parts of an aqueous solution of homopolymeric vinylene carbonate prepared as described under Example 1 and containing about 11% solids is treated with about 0.1 part of ethylene diamine at room temperature (20°–30° C.). Cross-linking takes place and an insoluble polymeric reaction product of the ethylene diamine and the homopolymeric vinylene carbamate is precipitated.

Similar results are obtained when any other primary or secondary polyamine is substituted for the ethylene diamine of this example, for instance diethylene triamine and tetraethylene pentamine.

Example 4

Example 1 is repeated with the exception that, instead of preparing and using homopolymeric vinylene carbamate as described in that example, there is prepared and used a copolymer of acrylonitrile and vinylene carbonate. The method of preparing the copolymer is as follows:

A reaction vessel equipped with a stirrer, reflux condenser, thermometer and gas-inlet tube, is placed in a constant-temperature bath which is maintained at 35° C. To the vessel is added a solution of 42 parts of acrylonitrile, 8 parts of vinylene carbonate, 800 parts of water, and 0.05 part of sulfuric acid. This is in a ratio of about 89.5 molar percent of acrylonitrile to about 10.5 molar percent of vinylene carbonate. The pH of the initial solution is 3. A rapid stream of pre-purified nitrogen is passed over the surface of the solution for 30 minutes. The nitrogen flow is then reduced to about two or three bubbles per second. A reduction oxidation catalyst system ("Redox" system) is prepared by dissolving 1.71 parts of ammonium persulfate and 0.71 part of sodium metabisulfite, each in 100 parts water. The catalyst solutions are added portion-wise to the reaction vessel at 25-minute intervals over a period of 2½ hours. After a total of reaction period of 4 hours, the copolymer which forms is collected on a Büchner funnel, washed with 1000 parts of water and dried in an oven at 70° C. for 3 hours. Forty-five (45) parts of a dry, white copolymer of acrylonitrile and vinylene carbonte is obtained.

To 350 parts of dimethyl formamide is added the above acrylonitrile-vinylene carbonate copolymer in an amount sufficient to form a solution containing one equivalent of the said copolymer. To the resulting solution is then added 58 parts of approximately 29% aqueous ammonia (17 parts $NH_3$ or 1 mole) and 200 parts of water. This is vigorously stirred for 2 hours at room temperature, yielding an ammonia-reaction product of the copolymer, more particularly a vinylene carbamate-acrylonitrile copolymer in aqueous dimethyl formamide solution. Evaporation of a portion of the vinylene carbamate-acrylonitrile copolymer solution cast on glass, in a 160° C. oven, yields a hard film which is more hydrophobic than the corresponding film made from the product of Example 1.

The vinylene carbamate copolymer of this example can be reacted with an aldehyde, specifically formaldehyde, as described in Example 2; and also can be cross-linked by reaction with a polyamine as described in Example 3.

Example 5

A copolymer of vinylene carbonate and ethyl acrylate is prepared as follows:

|                    | Parts | Approx. Molar Percent |
|--------------------|-------|-----------------------|
| Vinylene carbonate | 8.6   | 50                    |
| Ethyl acrylate     | 10.0  | 50                    |
| Benzene            | 20.0  |                       |
| Benzoyl peroxide   | 0.2   |                       | are heated together under reflux at the boiling temperature of the mass for 5 hours. A viscous solution containing a copolymer of ethyl acrylate and vinylene carbonate is obtained.

To the above vinylene carbonate-ethyl acrylate copolymer solution in benzene is added 3.66 parts of n-butyl amine, and the resulting solution is stirred at room temperature for 2 hours to insure completeness of the reaction. The reaction proceeds exothermically almost as soon as the reactants are brought into contact with each other.

Cellulosic materials, e.g., cotton cloth and other cellulosic textiles, paper and paper products, etc., when treated with the resulting solution of the n-butyl amine-reaction product (vinylene carbamate-ethyl acrylate copolymer) are thereby rendered more amenable to dyeing and printing.

If desired, formaldehyde- or other aldehyde-reaction products of the vinylene carbamate-ethyl acrylate copolymer can be made as hereinbefore described.

Instead of ethyl acrylate other comonomers, more particularly other esters of acrylic acid, e.g., methyl acrylate, propyl acrylate, isopropyl acrylate, n-butyl acrylate, isobutyl acrylate, sec.-butyl acrylate, tert.-butyl acrylate, amyl acylate, hexyl acrylate, propenyl acrylate, cyclohexyl acrylate, phenyl acrylate, benzyl acrylate, etc., can be substituted in the above formulation to obtain a suitable copolymer intermediate. As with ethyl acrylate, so too with such other comonomers the proportions of components can be widely varied within the range of from about 10 to 99.9 molar percent of the vinylene carbonate to from 90 to 0.1 molar percent of the other comonomer or comonomers.

*Example 6*

|  | Parts | Approx. Molar Percent |
| --- | --- | --- |
| Vinyl acetate | 50 | 50 |
| Vinylene carbonate | 50 | 50 |
| Benzoyl peroxide | 1 |  | are mixed together and charged to a heavy-walled glass tube, which thereafter is sealed under vacuum. Copolymerization is effected by heating the sealed tube in a 60° C. water bath for 24 hours.

The hard copolymer thereby obtained is dissolved in 300 parts of dioxane, and to the resulting solution is added 10 parts of piperidine. This solution is stirred for 4 hours at room temperature to insure completeness of the reaction.

Removal of the solvent by distillation or evaporation yields the piperidine-reaction product (vinylene carbamate-vinyl acetate copolymer) which is more hydrophilic in its properties than the starting vinylene carbonate copolymer intermediate. The dioxane solution of the piperidine-reaction product can be diluted with water, if desired, without precipitating the said reaction product from solution.

The vinylene carbamate copolymer of this example is useful in the production of cast films, protective coating compositions, adhesives, laminating compositions, for textile and paper treatment and for numerous other purposes. It is also amenable to reaction with formaldehyde and other aldehydes, as hereinbefore described, in order to obtain modified products having improved properties for a particular service application.

*Example 7*

The following ingredients are charged to a polymerization bottle:

|  | Parts | Approx. Molar Percent |
| --- | --- | --- |
| Butadiene | 59.4 | 63.1 |
| Acrylonitrile | 23.4 | 25.4 |
| Vinylene carbonate | 17.0 | 11.5 |
| Water | 150.0 |  |
| Potassium persulfate | 0.20 |  |
| Diisopropyl xanthogen disulfide | 0.30 |  |
| Sodium diisobutylnaphthalenesulfonate | 3.6 |  |
| Sodium pyrophosphate | 0.30 |  |
| Sodium hydroxide | 0.05 |  |
| Phenyl-β-naphthylamine | 3.0 |  |

The butadiene is the last component added. Sixty-one and four-tenths (61.4) parts of butadiene is added, the two parts excess being allowed to vaporize off, after which the bottle is sealed from the atmosphere. The bottle is placed in a constant temperature bath maintained at 30° C. and tumbled end over end for 30 hours. The bottle is opened, and the copolymer of butadiene, acrylonitrile and vinylene carbonate is precipitated from the resulting latex by adding thereto an aqueous 5% sodium chloride solution containing 2% sulfuric acid. The precipitated copolymer, more particularly a ternary polymer or tripolymer, is isolated, washed free of soluble contaminants and dried in a vacuum oven.

While kneading the tripolymer in a Banbury mixer, 10 parts of dimethylaminopropylamine is added. After a period of 2 hours' kneading and reaction in the Banbury, a titration indicates the disappearance of 50% of the aforesaid amine, which represents complete reaction to form a cationic ternary polymer, which may be represented as shown below:

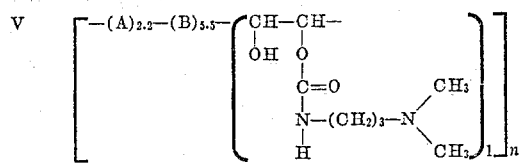

In the above formula A represents the acrylonitrile residue and B represents the butadiene residue. It is to be understood that the arrangement of the polymer segment as shown in Formula V is for purpose of illustration only, and it is not intended to be implied that this is necessarily the arrangement.

The cationic ternary polymer of this example is particularly useful in textile-sizing compositions, in the treatment of paper and as a beater additive in the preparation of paper.

*Example 8*

|  | Parts | Approx. Molar Percent |
| --- | --- | --- |
| Vinylene carbonate | 86 | 50 |
| Vinyl butyl ether | 98 | 50 |
| Benzene | 200 |  |
| Benzoyl peroxide | 2 |  | are heated together under reflux at the boiling temperature of the mass for 5 hours. A viscous benzene solution containing a copolymer of vinylene carbonate and vinyl butyl ether is obtained.

To 380 parts of the aforementioned benzene solution containing one equivalent of vinylene carbonate copolymer is added 58 parts of approximately 29% aqueous ammonia (17 parts NH₃ or 1 mole) and 200 parts of water. The resulting solution is stirred vigorously for 2 hours at room temperature, the remainder of the procedure, testing and uses of the vinylene carbamate copolymer being the same as those described under Example 1 with reference to the preparation of homopolymeric vinylene carbonate and subsequent treatment thereof.

*Example 9*

|  | Parts | Approx. Molar Percent |
| --- | --- | --- |
| Vinylene carbonate | 86 | 50 |
| Ketene dimethyl acetal | 89 | 50 |
| Benzene | 200 |  |
| Benzoyl peroxide | 2 |  |

The above ingredients are heated together under reflux at the boiling temperature of the mass for 6 hours, yielding a viscous benzene solution containing a copolymer of vinylene carbonate and ketene dimethyl acetal.

To 370 parts of the aforementioned benzene solution containing one equivalent of vinylene carbonate copolymer is added 170 parts of methanolic ammonia containing approximately 10% $NH_3$. This is stirred vigorously for 2 hours at room temperature. The ammonia-reaction product of this example is further processed, tested and used as described in Examples 1, 2 and 3. Similar results are obtained.

*Example 10*

Example 1 is repeated. To the aqueous solution containing the homopolymeric vinylene carbamate and water washings of the cumene solution combined therewith is added 50 parts (slight excess) of cold acetaldehyde, and the mixture is stirred for 10 hours while keeping the temperature at 0°–10° C., after which the reaction mass is heated to 50° C. to remove the unreacted acetaldehyde.

The acetaldehyde-reaction product of the vinylene carbamate homopolymer is useful in such applications as mentioned in the preceding examples with reference to other products, and also as a modifier of natural resins and other synthetic materials, especially synthetic resins.

It will be understood, of course, by those skilled in the art that my invention is not limited to the specific reactants, proportions thereof and conditions of reaction given by way of illustration in the foregoing examples. For instance, instead of carrying out the reaction in the presence of water or methanol, as in certain of the examples, the reaction can be effected while the polymer of vinylene carbonate and amine reactant (ammonia, or a primary or secondary amine) are dissolved or dispersed in various other liquid media, numerous examples of which have been given hereinbefore. Likewise, aldehydes (or other active carbonyl-containing compounds) other than the aldehydes employed in individual examples can be used. Numerous examples of such active carbonyl-containing compounds have been given hereinbefore. Also, instead of the particular amine reactant or mixture of amine reactants set forth in the individual examples, the reaction with the polymer of vinylene carbonate will proceed, to the best of my knowledge and belief, with any other primary or secondary amine, or with mixtures thereof in any proportion, or with any amines containing one or more primary amino groups and, also, one or more secondary amino groups, with or without additional tertiary amino groups. Thus, the amine reactant can be, for example, ammonia or other nitrogenous compound having at least one radical represented by the formula VI

where R represents hydrogen and R' represents hydrogen or any monovalent organic (carbon-containing) radical, e.g., a hydrocarbon radical, a hydroxyhydrocarbon radical (e.g., hydroxyethyl, hydroxyphenyl, hydroxyxylyl, etc.), a heterocyclic radical (e.g., furyl, furfuryl, etc.), the radical —NH—$NH_2$ and higher members of the homologous series, etc. Other illustrative examples of hydrocarbon and hydroxyhydrocarbon radicals which R' in Formula VI can represent are given, for instance, in Patent No. 2,582,594 dated January 15, 1952, column 2, lines 20–54. Additional examples of sub-classes and of species of primary and secondary amines (amino-containing bodies) that can be used as a reactant with the polymer of vinylene carbonate in practicing the present invention are given elsewhere in this same Patent No. 2,582,594.

Among the species of primary and secondary amines that are useful (either singly or a plurality thereof, as desired or as may be required in order to obtain a product having the desired properties) as a reactant with the vinylene carbonate polymer may be mentioned the following:

Methyl amine (monomethylamine)
Dimethyl amine
Ethyl amine
Propyl amine
Dipropyl amine
N-ethylbutyl amine ($C_2H_5NHC_4H_7$)
Dibutyl amine
2-amino-4-methylpentane [$CH_3CHNH_2CH_2CH(CH_3)_2$]
n-Amyl amine
Di-n-amyl amine
Hexyl amine
Dihexyl amine
Heptyl amine
Diheptyl amine
Octyl amine
Dioctyl amine
Decyl amine
Didecyl amine
Octadecyl amine
Dioctadecyl amine
1,3-diaminopropane
3-diethylaminopropyl amine

[$(C_2H_5)_2NCH_2CH_2CH_2NH_2$]

1,3-diaminobutane ($NH_2CH_2CH_2CHNH_2CH_3$)
1,3-bis-ethylaminobutane

[$C_2H_5NHCH_2CH_2CHNH(C_2H_5)CH_3$]

1,4-diaminobutane
1,5-diaminopentane
1,6-diaminohexane
1,7-diaminoheptane
1,8-diaminooctane
Triethylene tetramine

[$NH_2(CH_2CH_2NH)_2CH_2CH_2NH_2$]

Tetraethylene pentamine
Pentaethylene hexamine
Propylenediamine (1,2-diaminopropane)
Diethanolamine
Hydroxyethyl ethylene diamine
Monoisopropanolamine
Diisopropanolamine
Bis(3-aminopropyl) ether ($NH_2CH_2CH_2CH_2OCH_2CH_2CH_2NH_2$)

Bis(4-aminobutyl) ether
Bis(5-aminoamyl) ether
Bis(6-aminohexyl) ether
o-, m- and p-Phenylenediamines
Benzidine
2-aminobenzidine
Aminoguanidine
Guanidine
Monophenyl biguanide
Hydrazine
1,1-dimethylhydrazine
Semicarbazide
N-butylaniline
m- and p-Toluidines
o-, m- and p-Tolylenediamines
p,p'-Diaminodiphenyl ether
1,4-diaminoanthraquinone
p,p'-Diaminodiphenylmethane
4-amino-2-butanol
1-methylamino-2-propanol ($CH_3NHCH_2CHOHCH_3$)
5-isopropylamino-1-pentanol

[$HOCH_2CH_2CH_2CH_2CH_2NHCH(CH_3)_2$]

Ethyleneimine
Propyleneimine
Morpholine
Thiamorpholine
2-methylmorpholine
3-ethylmorpholine
3,5-dimethylmorpholine
2,3,5-trimethylmorpholine
Furfuryl amine As indicated hereinbefore, the properties of the fundamental resinuos or non-resinous reaction products of this invention can be varied widely by introducing other modifying bodies before, during or after effecting reaction between the primary components. Thus, as modifying agents I may use, for instance, urea and substituted ureas, aminotriazines (e.g., melamine, ammelide, ammeline, etc.), monohydric alcohols, e.g., methyl, ethyl, propyl, isopropyl, butyl, hexyl, n-octyl, 2-ethylhexyl, decyl, dodecyl, cetyl, lauryl, capryl, tetrahydrofurfuryl alcohol, pentanol or mixtures of isomeric pentanols (which mixtures also may include n-pentanol), cyclohexanol, methylcyclohexanol, etc.; polyhydric alcohols, e.g., glycerol, pentaerylthritol, diphentaerythritol, mannitol, sorbitol, ethylene glycol, diethylene glycol, and others such as are disclosed, for example, in Schaefer Patent No. 2,481,155; alcohol-ethers, e.g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; phenol and substituted phenols; and the like.

Illustrative examples of other modifying bodies that can be incorporated into the fundamental reaction products, during their preparation or after they have been formed, are melamine-aldehyde condensation products (e.g., melamine-formaldehyde condensation products), urea-aldehyde condensation products (e.g., urea-formaldehyde condensation products), urea-melamine-aldehyde condensation products (e.g., urea-melamine-formaldehyde condensation products), protein-aldehyde condensation products, amiodiazine-aldehyde condensation products, aminotriazole-aldehyde condensation products, aniline-aldehyde condensation products, phenol-aldehyde condensation products (e.g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc.; polyvinyl compounds such as polyvinyl alcohol, polyvinyl esters (e.g., polyvinyl acetate, polyvinyl butyrate, etc.), polyvinyl ethers, including polyvinyl acetals, e.g., polyvinyl formal, polyvinyl butyral, etc.

Coating compositions may be prepared from the thermosetting or potentially thermosetting resinous compositions of this invention alone or admixed with melamine-formaldehyde resins, fatty oil or fatty oil acid-modified alkyd resins, or other film-forming materials commonly used in protective coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, dated October 15, 1940.

Dyes, pigments, driers, curing agents (in some cases where a more accelerated cure is desired), plasticizers, mold lubricants, opacifiers and various fillers (e.g., wood flour, glass fibers, asbestos, mineral wool, mica dust, powdered quartz, titanium dioxide, zinc oxide, talc, China clay, carbon black, etc.) may be compounded by conventional practice with the synthetic materials of my invention, as desired or as conditions may require, in order to provide a coating, molding or other composition best adapted to meet a particular service use. For additional or more detailed information concerning the modifying ingredients that may be employed in producing coating compositions from my resins, reference is made to the aforementioned Moore patent.

The modified and unmodified reaction products, more particularly resinous reaction products, of this invention have a wide variety of uses. For example, in addition to their use in the production of coating compositions, they may be employed as modifiers of other compatible natural and synthetic resins. Thus, some of them advantageously may be used to improve the plasticity or flow characteristics of thermosetting resins which have insufficient or unsatisfactory plasticity during curing to an insoluble, infusible state, e.g., certain urea-formaldehyde or melamine-formaldehyde resins or molding compositions where better flow during molding, without decreasing the cure time, is desirable. The soluble resins of this invention also can be dissolved in appropriate solvents. Some of the solvents that may be employed to dissolve a particular reaction product of my invention, in addition to others to which reference hereinbefore has been made, include benzene, toluene, amyl acetate, butanol, methyl ethyl ketone, etc. The dissolved resins can be used as laminating varnishes in the production of laminated articles wherein sheet materials, e.g., paper, cloth, sheet asbestos, etc., are coated or coated and impregnated with a resin solution, superimposed and thereafter united under heat and pressure. They also can be employed as an adhesive in making laminated plywood, laminated glass cloth, as an impregnant of pulp preforms from which molded articles thereafter are made by subjecting the impregnated preforms to heat and pressure, as impregnants for electrical coils and for other electrically insulating applications, for bonding together abrasive grains in the production of resin-bonded abrasive articles such, for instance, as grindstones, sand papers, etc., in the manufacture of electrical resistors, etc. They also can be used for treating textile materials (e.g., linen, rayon, and other cellulose-containing textiles, wool, silk, and other natural or synthetic proteinaceous textiles, including nylon and textiles derived from polyacrylonitrile and acrylonitrile copolymers, and from casein, soyabeans, etc.), in filament, thread, yarn, fabric (woven or felted) or other forms, in order to improve the properties of such textile materials, e.g., to increase the stiffness, to increase the service life, to impart shrinkage resistance thereto, or otherwise to enhance the properties of the treated materials and to make them more useful or serviceable to the ultimate user. They also may be employed for treating leather to improve its appearance and physical properties, and in the treatment of paper or as a beater additive prior to the formation of the paper.

I claim:

1. A composition comprising the product of reaction of ingredients comprising (1) a polymer of vinylene carbonate containing at least 10 mole percent of combined vinylene carbonate and up to 90 mole percent of a different compound which is copolymerizable with vinylene carbonate and which contains a $CH_2=C<$ grouping, and (2) at least one nitrogenous compound selected from the class consisting of ammonia, primary amines and secondary amines, said reaction product being a carbamate.

2. A composition comprising the product of reaction of ingredients comprising (1) a homopolymer of vinylene carbonate and (2) at least one nitrogenous compound selected from the class consisting of ammonia, primary amines and secondary amines, said reaction product being a carbamate.

3. A composition comprising the product of reaction of ingredients comprising (1) a copolymer which is a product of polymerization of a mixture of copolymerizable ingredients including (a) vinylene carbonate and (b) a different compound containing a $CH_2=C<$ grouping, the vinylene carbonate of (a) constituting at least 50 mole percent of the said mixture of copolymerizable ingredients, and (2) at least one nitrogenous compound selected from the class consisting of ammonia, primary amines and secondary amines, said reaction product being a carbamate.

4. A composition comprising the product of reaction of ingredients comprising (1) an aldehyde and (2) a reaction product of ingredients comprising (a) a polymer of vinylene carbonate containing at least 10 mole percent of combined vinylene carbonate and up to 90 mole percent of a different compound which is copolymerizable with vinylene carbonate and which contains a $CH_2=C<$ grouping, and (b) at least one nitrogenous compound selected from the class consisting of ammonia, primary amines and secondary amines, said reaction product being a carbamate.

5. A composition as in claim 4 wherein the aldehyde of (1) is formaldehyde.

6. A composition comprising the product of reaction of ingredients comprising (1) formaldehyde and (2) a carbamate which is the reaction product of a homopolymer of vinylene carbonate with ammonia.

7. A composition comprising the product of reaction of ingredients comprising (1) formaldehyde and (2) a carbamate which is the reaction product of a homopolymer of vinylene carbonate with a primary saturated aliphatic amine.

8. A composition comprising the product of reaction of ingredients comprising (1) formaldehyde and (2) a carbamate which is the reaction product of a homopolymer of vinylene carbonate with a secondary saturated aliphatic amine.

9. A composition comprising the product of reaction of ingredients comprising (1) formaldehyde and (2) a carbamate which is the reaction product of ingredients comprising (a) ammonia and (b) a copolymer which is a product of polymerization of a mixture of copolymerizable ingredients including (A) vinylene carbonate and (B) a different compound containing a $CH_2=C<$ grouping, the vinylene carbonate of (A) constituting at least 50 mole percent of the said mixture of copolymerizable ingredients.

10. A composition comprising the product of reaction of ingredients comprising (1) formaldehyde and (2) a carbamate which is the reaction product of ingredients comprising (a) a primary saturated aliphatic amine and (b) a copolymer which is a product of polymerization of a mixture of copolymerizable ingredients including (A) vinylene carbonate and (B) a different compound containing a $CH_2=C<$ grouping, the vinylene carbonate of (A) constituting at least 50 mole percent of the said mixture of copolymerizable ingredients.

11. A composition comprising the product of reaction of ingredients comprising (1) formaldehyde and (2) a carbamate which is the reaction product of ingredients comprising (a) a secondary saturated aliphatic amine and (b) a copolymer which is a product of polymerization of a mixture of copolymerizable ingredients including (A) vinylene carbonate and (B) a different compound containing a $CH_2=C<$ grouping, the vinylene carbonate of (A) constituting at least 50 mole percent of the said mixture of copolymerizable ingredients.

12. A liquid composition comprising (1) a soluble product of reaction of ingredients comprising (a) a polymer of vinylene carbonate containing at least 10 mole percent of combined vinylene carbonate and up to 90 mole percent of a different compound which is copolymerizable with vinylene carbonate and which contains a $CH_2=C<$ grouping, and (b) at least one nitrogenous compound selected from the class consisting of ammonia, primary amines and secondary amines, and (2) a solvent for the reaction product of (1), which latter is a carbamate.

13. A heat-curable composition comprising a heat-convertible resinous product of reaction of ingredients comprising (1) a polymer of vinylene carbonate containing at least 10 mole percent of combined vinylene carbonate and up to 90 mole percent of a different compound which is copolymerizable with vinylene carbonate and which contains a $CH_2=C<$ grouping, and (2) at least one nitrogenous compound selected from the class consisting of ammonia, primary amines and secondary amines, said reaction product being a carbamate.

14. A product comprising the cured composition of claim 13.

15. The method of preparing a new synthetic composition which comprises reacting together, to form a carbamate, ingredients comprising (1) a polymer of vinylene carbonate containing at least 10 mole percent of combined vinylene carbonate and up to 90 mole percent of a different compound which is copolymerizable with vinylene carbonate and which contains a $CH_2=C<$ grouping, and (2) at least one nitrogenous compound selected from the class consisting of ammonia, primary amines and secondary amines.

16. The method of preparing new synthetic composition which comprises effecting reaction between ingredients comprising (1) an aldehyde and (2) a carbamate which is the reaction product of ingredients comprising (a) a polymer of vinylene carbonate containing at least 10 mole percent of combined vinylene carbonate and up to 90 mole percent of a different compound which is copolymerizable with vinylene carbonate and which contains a $CH_2=C<$ grouping, and (2) at least one nitrogenous compound selected from the class consisting of ammonia, primary amines and secondary amines.

17. A method as in claim 16 wherein the aldehyde of (1) is formaldehyde.

18. The process which consists essentially in reacting a homopolymer of vinylene carbonate with aqueous ammonia at room temperature.

References Cited in the file of this patent

UNITED STATES PATENTS

| | | |
|---|---|---|
| 2,483,194 | Gleim | Sept. 27, 1949 |
| 2,563,771 | Adelson | Aug. 7, 1951 |

OTHER REFERENCES

Newman: J.A.C.S., vol. 75, March 5, 1953, pp. 1263 and 1264.

UNITED STATES PATENT OFFICE
CERTIFICATE OF CORRECTION

Patent No. 2,930,779                          March 29, 1960

Erhart K. Drechsel

It is hereby certified that error appears in the printed specification of the above numbered patent requiring correction and that the said Letters Patent should read as corrected below.

Column 3, line 30, for "compound" read -- compounds --; column 7, line 21, for "aryacrylic" read -- arylacrylic --; line 23, for "itaonic" read -- itaconic --; line 63, for "iodide," read -- halides, --; column 9, line 19, for "herinafter" read -- hereinafter --; column 10, line 26, for "reduction oxidation" read -- reduction-oxidation --; line 32, after "total" strike out "of"; column 11, line 11, for "acryliate" read -- acrylate --; line 17, for "acylate" read -- acrylate --; column 15, line 2, for "resinuos" read -- resinous --; line 14, for "pentaerylthritol, diphentaerythritol," read -- pentaerythritol, dipentaerythritol, --; line 32, for "amiodiazine-" read -- aminodiazine- --.

Signed and sealed this 25th day of October 1960.

(SEAL)
Attest:

KARL H. AXLINE                                  ROBERT C. WATSON
Attesting Officer                              Commissioner of Patents